United States Patent
Cha et al.

(10) Patent No.: US 9,710,963 B2
(45) Date of Patent: *Jul. 18, 2017

(54) PRIMITIVE FITTING APPARATUS AND METHOD USING POINT CLOUD

(71) Applicant: Electronics and Telecommunications Research Institute, Daejeon (KR)

(72) Inventors: Young Mi Cha, Busan (KR); Chang Woo Chu, Daejeon (KR); Jae Hean Kim, Yongin-si (KR); Il Kyu Park, Daejeon (KR); Bon Ki Koo, Daejeon (KR); Jin Sung Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 708 days.

This patent is subject to a terminal disclaimer.

(21) Appl. No.: 14/193,313

(22) Filed: Feb. 28, 2014

(65) Prior Publication Data

US 2014/0245231 A1 Aug. 28, 2014

(30) Foreign Application Priority Data

Feb. 28, 2013 (KR) .......................... 10-2013-0021899

(51) Int. Cl.
*G06T 17/00* (2006.01)
*G06T 17/10* (2006.01)

(52) U.S. Cl.
CPC .................................. *G06T 17/10* (2013.01)

(58) Field of Classification Search
CPC ..................................................... G06T 17/20
See application file for complete search history.

(56) References Cited

U.S. PATENT DOCUMENTS

| 6,771,840 | B1* | 8/2004 | Ioannou | G01S 17/89 |
| | | | | 382/154 |
| 7,940,279 | B2 | 5/2011 | Pack | |
| 2010/0053163 | A1* | 3/2010 | Wallace | G06T 17/00 |
| | | | | 345/427 |
| 2011/0304619 | A1 | 12/2011 | Fu et al. | |
| 2013/0181983 | A1* | 7/2013 | Kitamura | G01B 11/24 |
| | | | | 345/419 |
| 2013/0268862 | A1* | 10/2013 | Glaser | G06F 3/04847 |
| | | | | 715/738 |
| 2014/0105506 | A1* | 4/2014 | Drost | G06K 9/00201 |
| | | | | 382/199 |
| 2015/0172628 | A1* | 6/2015 | Brown | G06T 17/10 |
| | | | | 348/47 |

OTHER PUBLICATIONS

Ruwen Schnabel et al., "Efficient RANSAC for Point-Cloud Shape Detection," Computer Graphics Forum, Jun. 2007, pp. 214-226, vol. 26, No. 2, The Eurographics Association and Blackwell Publishing Ltd.

* cited by examiner

*Primary Examiner* — Phi Hoang
(74) *Attorney, Agent, or Firm* — William Park & Associates Ltd.

(57) ABSTRACT

A primitive fitting apparatus is provided. The primitive fitting apparatus may include a selecting unit to receive, from a user, a selection of points used to fit a primitive a user desires to fit from a point cloud, an identifying unit to receive a selection of the primitive from the user and to identify the selected primitive, and a fitting unit to fit the primitive to correspond to the points, using the points and primitive.

17 Claims, 8 Drawing Sheets

——— PRIMITIVE SELECTED BY USER AND IDENTIFIED
----- PRIMITIVE EXTRACTED BASED ON POINT SELECTED BY USER
⊘ POINT USED TO OBTAIN NORMAL ANGLE OF PRIMITIVE

AREA OF PRIMITIVE SELECTED BY USER AND IDENTIFIED
 AREA OF PRIMITIVE INCLUDING POINTS CORRESPONDING TO INLIERS

——— PRIMITIVE SELECTED BY USER AND IDENTIFIED

- - - - - PRIMITIVE EXTRACTED BASED ON POINT SELECTED BY USER

● POINT USED TO OBTAIN NORMAL ANGLE OF PRIMITIVE

PRIMITIVE FITTING APPARATUS AND METHOD USING POINT CLOUD

CROSS-REFERENCE TO RELATED APPLICATIONS

This application claims the benefit under 35 U.S.C. §119(a) of Korean Patent Application No. 10-2013-0021899, filed on Feb. 28, 2013, in the Korean Intellectual Property Office, the entire disclosure of which is incorporated herein by reference.

BACKGROUND

1. Field of the Invention

The present invention relates to a primitive fitting apparatus and method. More particularly, the present invention relates to a primitive fitting apparatus and method for more accurately fitting a primitive using point cloud.

2. Description of the Related Art

In a conventional method of fitting a primitive, three-dimensional (3D) data for fitting of a primitive may be quickly acquired using scanners. The 3D data may be represented by a 3D point cloud, and may include a massive number of points. Additionally, a primitive may be fitted based on the acquired 3D data.

Recently, various restoration schemes for easily and quickly restoring a 3D object using 3D data are being developed. Specifically, in restoration schemes, to automatically fit a primitive, when points of 3D data are input, distances between the points, and normal vectors of the points may be compared, using an error function. Additionally, based on a result of the comparing, a primitive optimized for inliers by removing outliers from the points may be obtained.

However, in restoration schemes, the optimized primitive may be included in a portion of a primitive based on the normal vectors of the points. In this instance, an accuracy of the primitive may be reduced, and a primitive that does not correspond to the input points may be obtained.

SUMMARY

An aspect of the present invention provides a primitive fitting apparatus for fitting a more optimized primitive, based on an area of a primitive a user desires to fit, and an area of a primitive that includes inliers by removing outliers.

Another aspect of the present invention also provides a primitive fitting apparatus for fitting an optimized primitive based on an area of a primitive a user desires to fit, and an area of a primitive that includes inliers by removing outliers, so that the primitive that includes the inliers may be prevented from being included in a portion of the primitive the user desires to fit.

According to an aspect of the present invention, there is provided a primitive fitting apparatus including: a selecting unit to receive, from a user, a selection of points from a point cloud, the points being used to fit a primitive a user desires to fit; an identifying unit to receive a selection of the primitive from the user, and to identify the selected primitive; and a fitting unit to fit the identified primitive to correspond to the points, using the points and primitive.

The selecting unit may provide the user with a user interface enabling the selection of the points, and may receive the selection of the points.

The selecting unit may receive a selection of a point with a normal vector in a point cloud extracted to be provided to the user The selecting unit may hierarchically receive the selection of the points from the user through a node of a hierarchical tree structure.

The identifying unit may identify a primitive of an object that is three-dimensionally represented.

The fitting unit may remove outliers, based on a difference in a distance between a point selected by the user and points located neighboring the selected point.

The fitting unit may remove outliers, based on a difference in a normal vector between a normal angle of a point selected from the identified primitive and a normal angle of a point selected from a primitive extracted based on the points.

The fitting unit may compare an area of a primitive optimized for inliers by removing the outliers with an area of a region corresponding to a mesh formed by connecting points corresponding to the inliers, and may fit the primitive based on a ratio of the areas.

The fitting unit may compare the area of the primitive with the area of the region, based on a threshold associated with a difference in a preset area ratio.

According to another aspect of the present invention, there is provided a primitive fitting apparatus including: an extracting unit to extract a normal vector of a point, using a point cloud to be provided to a user; a determining unit to provide the user with a point corresponding to the extracted normal vector, and to determine a primitive the user desires to fit, and points selected by the user, the points being used to fit the primitive based on the normal vector; and a fitting unit to fit the primitive to correspond to the points, using the points and the primitive.

According to still another aspect of the present invention, there is provided a primitive fitting method including: receiving, from a user, a selection of points from a point cloud, the points being used to fit a primitive a user desires to fit; receiving a selection of the primitive from the user, and identifying the selected primitive; and fitting the identified primitive to correspond to the points, using the points and primitive.

The receiving of the selection of the points may include providing the user with a user interface enabling the selection of the points, and receiving the selection of the points.

The receiving of the selection of the points may include receiving a selection of a point with a normal vector in a point cloud extracted to be provided to the user.

The receiving of the selection of the points may include hierarchically receiving the selection of the points from the user through a node of a hierarchical tree structure.

The receiving of the selection of the primitive may include identifying a primitive of an object that is three-dimensionally represented.

The fitting may include removing outliers, based on a difference in a distance between a point selected by the user and points located neighboring the selected point.

The fitting may include removing outliers, based on a difference in a normal vector between a normal angle of a point selected from the identified primitive and a normal angle of a point selected from a primitive extracted based on the points.

The fitting may include comparing an area of a primitive optimized for inliers by removing the outliers with an area of a region corresponding to a mesh formed by connecting points corresponding to the inliers, and fitting the primitive based on a ratio of the areas.

The fitting may include comparing the area of the primitive with the area of the region, based on a threshold associated with a difference in a preset area ratio.

According to yet another aspect of the present invention, there is provided a primitive fitting method including: extracting a normal vector of a point, using a point cloud to be provided to a user; providing the user with a point corresponding to the extracted normal vector, and determining a primitive the user desires to fit, and points selected by the user, the points being used to fit the primitive based on the normal vector; and fitting the primitive to correspond to the points, using the points and the primitive.

EFFECT

According to embodiments of the present invention, it is possible to provide a primitive fitting apparatus for fitting a more optimized primitive, based on an area of a primitive a user desires to fit, and an area of a primitive that includes inliers by removing outliers.

Additionally, according to embodiments of the present invention, it is possible to provide a primitive fitting apparatus for fitting an optimized primitive based on an area of a primitive a user desires to fit, and an area of a primitive that includes inliers by removing outliers, so that the primitive that includes the inliers may be prevented from being included in a portion of the primitive the user desires to fit.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
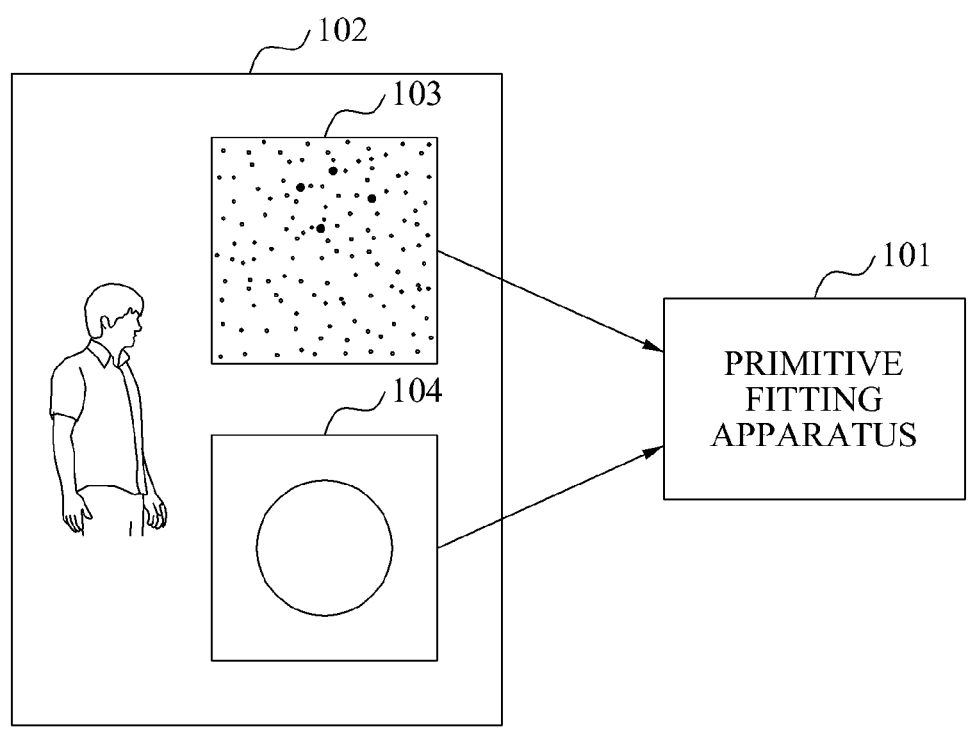
FIG. 1 is a diagram illustrating a primitive fitting apparatus according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a primitive fitting apparatus according to an embodiment of the present invention.

Referring to FIG. 1, a primitive fitting apparatus 101 may provide a user with a point cloud. Specifically, the primitive fitting apparatus 101 may provide a user interface through which a user may select a point from among a plurality of points included in the point cloud. In this instance, each of the plurality of points may have a normal vector. Additionally, the plurality of points may include three-dimensional (3D) points. The primitive fitting apparatus 101 may receive a selection of a point for fitting of a primitive from a user.

Additionally, the primitive fitting apparatus 101 may provide a user interface through which the user may select a primitive 104, the user desires to fit, based on the point selected by the user. In this instance, a primitive may include a 3D object, for example, a sphere, a cylinder, a torus, a cone, and the like. Furthermore, the primitive fitting apparatus 101 may identify the primitive 104 selected by a user 102. The primitive 104 may be a 3D object the user 102 desires to fit, and may be compared with a primitive including points 103. In other words, an area of the primitive 104 may be compared with an area of the primitive including the points 103.

The primitive fitting apparatus 101 may fit the primitive including the points 103, using the points 103 and the primitive 104. Specifically, the primitive fitting apparatus 101 may fit the primitive 104 so that the primitive 104 may correspond to the points 103. For example, the primitive fitting apparatus 101 may adjust a shape, a size, and the like of the primitive 104 so that the primitive 104 selected first by the user 102 may include the points 103.

Additionally, to increase accuracy of fitting of the primitive 104, points corresponding to outliers may be removed from the points 103. Specifically, the primitive fitting apparatus 101 may remove points corresponding to outliers from the points 103, based on a difference in a distance and an angle between the points 103.

Subsequently, the primitive fitting apparatus 101 may obtain an area of a primitive that includes inliers by removing the points corresponding to the outliers from the points 103. Additionally, the primitive fitting apparatus 101 may obtain an area of a region including inliers. In this instance, the area of the region may be determined to be a sum of areas of triangles forming a mesh connecting points corresponding to the inliers.

Additionally, the primitive fitting apparatus 101 may compare the area of the primitive with the area of the region, and may fit the primitive. Specifically, the primitive fitting apparatus 101 may fit the primitive, based on an example in which a difference between the area of the primitive and the area of the region is greater than a threshold.

Figure 2:
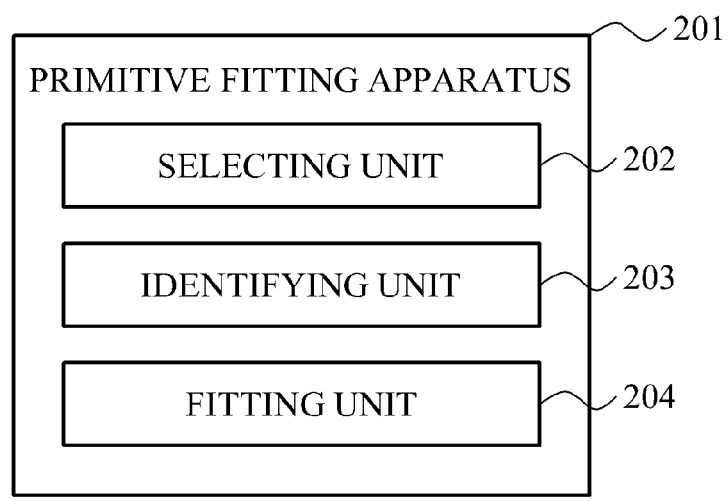
FIGS. 2 and 3 are block diagrams illustrating detailed configurations of primitive fitting apparatuses according to an embodiment of the present invention.
Figure 3:
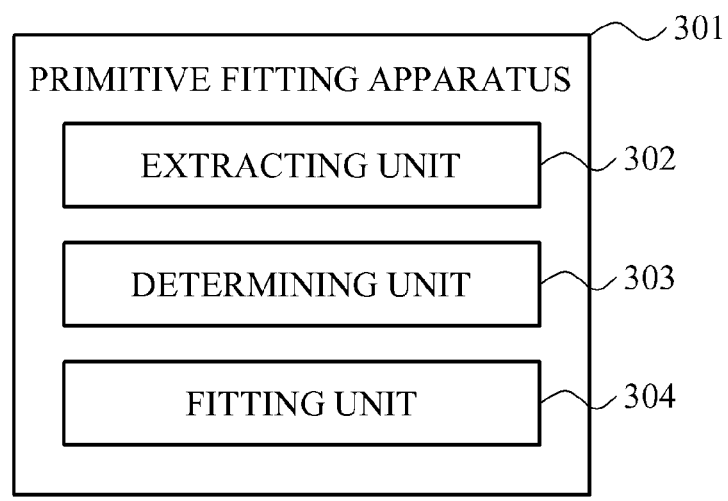

FIGS. 2 and 3 are block diagrams illustrating detailed configurations of primitive fitting apparatuses 201 and 301 according to an embodiment of the present invention.

Referring to FIG. 2, the primitive fitting apparatus 201 may include a selecting unit 202, an identifying unit 203, and a fitting unit 204.

The selecting unit 202 may receive, from a user, a selection of a point for fitting of a primitive from a point cloud. In this instance, the selecting unit 202 may provide a user interface through which the user may hierarchically select points. Additionally, to provide a hierarchical user interface to a user, the selecting unit 202 may include a node of a hierarchical tree structure. Since it is difficult for a user to view a point cloud at once, the hierarchical user interface may be provided. The hierarchical tree structure may include a k-d tree, an octree, and the like.

The identifying unit 203 may receive, from a user, a selection of a primitive the user desires to fit. In this instance, the identifying unit 203 may provide a user interface through which the user may select the primitive the user desires to fit. For example, the identifying unit 203 may provide a user interface that provides the user with a primitive, for example, a sphere, a cylinder, a torus, a cone, and the like, so that the user may select a corresponding (*desired primitive through the user interface. Additionally, the identifying unit 203 may directly display a primitive, for example, a sphere, a cylinder, a torus, a cone, and the like, that the user desires to fit, without a selection tap.

In addition, the identifying unit 203 may identify a primitive mapped to the primitive that is selected by the user through the user interface.

The fitting unit 204 may fit the identified primitive, using the selected point and the identified primitive, so that the identified primitive may correspond to the selected point. Specifically, the fitting unit 204 may remove outliers, using a difference in a distance and an angle between points for primitive fitting. In this instance, the fitting unit 204 may obtain the difference in the distance and the angle between the points, using an error function included in a RANdom SAmple Consensus (RANSAC) algorithm. A parameter used in the RANSAC algorithm may be input from the user. For example, a parameter may include a number of points neighboring inliers in a point cloud, a distance between points, and the like. Additionally, the parameter may not be limited to the above-description and accordingly, various parameters may be used.

The fitting unit 204 may remove outliers, using a difference in a distance between points, based on the parameter. Specifically, the fitting unit 204 may extract a point located near a point selected by the user. Additionally, the fitting unit 204 may remove points located far from the selected point. In other words, the fitting unit 204 may remove outliers, using a difference in a distance between the selected point and points that may not be used to form a primitive.

Additionally, the fitting unit 204 may remove outliers, using a difference in an angle (*a normal vector between points, based on the parameter. Specifically, the fitting unit 204 may select a single point from a primitive a user desires to fit, and may obtain a normal angle in the selected point. The fitting unit 204 may also obtain a normal angle in a single point selected from a primitive extracted using points selected by a user. Additionally, the fitting unit 204 may remove outliers, using points and an angle of a primitive the user desires to fit. In other words, the fitting unit 204 may remove outliers, using a difference between an angle of the primitive the user desires to fit and an angle of an extracted primitive.

The fitting unit 204 may extract a primitive that includes points corresponding to inliers, by removing outliers using a difference in a distance and an angle between points.

The fitting unit 204 may compare an area of a region that includes points corresponding to inliers by removing outliers with an area of a primitive optimized for inliers, and may fit a primitive. In this instance, the area of the region may be determined to be a sum of areas of triangles forming a mesh connecting points.

Specifically, when a difference between the area of the optimized primitive and the area of the region is greater than a preset difference of areas, the fitting unit 204 may determine that a primitive is not accurately extracted, and that a new primitive may need to be extracted.

Conversely, when the difference between the area of the optimized primitive and the area of the region is less than the preset difference of areas, the fitting unit 204 may determine that a primitive is accurately extracted, and may provide a user with the extracted primitive.

Referring to FIG. 3, the primitive fitting apparatus 301 may include an extracting unit 302, a determining unit 303, and a fitting unit 304.

The extracting unit 302 may provide a user with a point cloud. In this instance, the extracting unit 302 may extract a normal vector of each of a plurality of points included in the point cloud, and may provide the user with the extracted normal vector. The extracting unit 302 may provide the plurality of points so that the user may select a point with the normal vector, and accordingly a selection of a point of a primitive may be more accurately received from the user, by minimizing a number of unnecessary points.

For example, when a normal vector of each of a plurality of points included in the point cloud is not provided, the extracting unit 302 may perform normal estimation, and may extract the normal vector. Additionally, the extracting unit 302 may store the extracted normal vector as data.

The determining unit 303 may provide a user with points corresponding to the extracted normal vectors. Additionally, the determining unit 303 may hierarchically receive a selection of points through a user interface provided by the primitive fitting apparatus 301. Additionally, the determining unit 303 may receive a selection of a primitive a user desires to fit, through a user interface. The determining unit 303 may determine a primitive corresponding to the selected primitive.

The fitting unit 304 may fit a primitive, using the point and primitive, so that the primitive may correspond to the point. To more accurately fit the primitive, the fitting unit 304 may remove outliers, using a difference in a distance and an angle between points. Additionally, the fitting unit 304 may determine a difference between an area of a primitive that includes points corresponding to inliers by removing outliers and an area of a primitive optimized for inliers, by comparing the areas. When the difference between the areas is greater than a threshold, the fitting unit 304 may fit a primitive.

Figure 4:
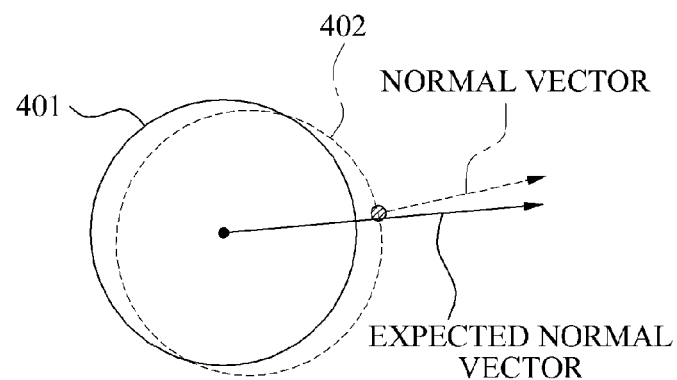
FIG. 4 is a diagram illustrating a removal of outliers using an angle difference according to an embodiment of the present invention.

FIG. 4 is a diagram illustrating a removal of outliers using an angle difference according to an embodiment of the present invention.

Referring to FIG. 4, a primitive fitting apparatus may obtain a normal angle of a primitive that is selected by a user and identified, and a normal angle of a primitive including points corresponding to inliers.

Specifically, the primitive fitting apparatus may select a single point from a primitive 401 selected by a user and identified. Additionally, the primitive fitting apparatus may obtain a normal angle in the selected point. The primitive fitting apparatus may select a single point from a primitive 402 extracted based on the selected point. Additionally, the primitive fitting apparatus may obtain a normal angle in the selected point.

Figure 5:
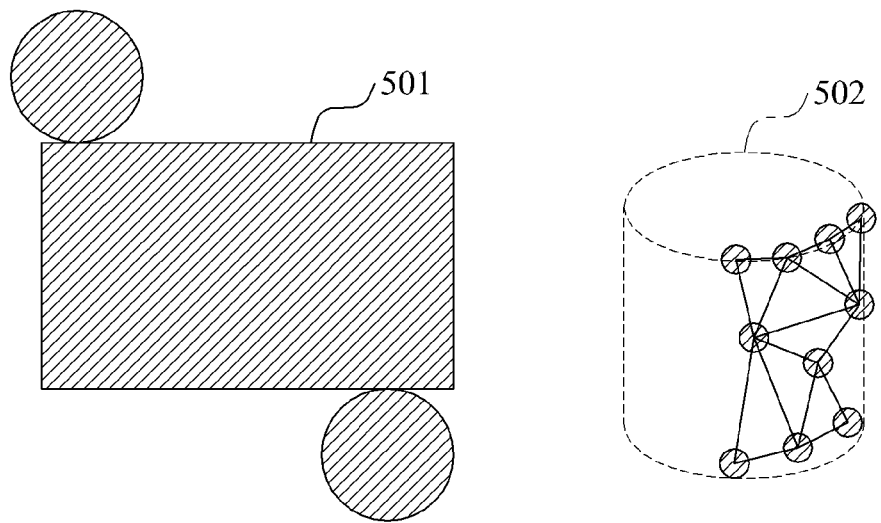
FIG. 5 is a diagram illustrating comparison of areas of primitives according to an embodiment of the present invention.
Figure 5:
Figure 5:
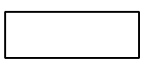

FIG. 5 is a diagram illustrating comparison of areas of primitives according to an embodiment of the present invention.

Referring to FIG. 5, a primitive fitting apparatus may compare an area 501 of a primitive that is selected by a user and identified with an area 502 of a primitive including points corresponding to inliers. The primitive fitting apparatus may determine a difference between the areas 501 and 502.

The primitive fitting apparatus may minimize the difference between the areas 501 and 502, and may more accurately fit a primitive so that the primitive may correspond to a primitive desired by a user.

Figure 6:
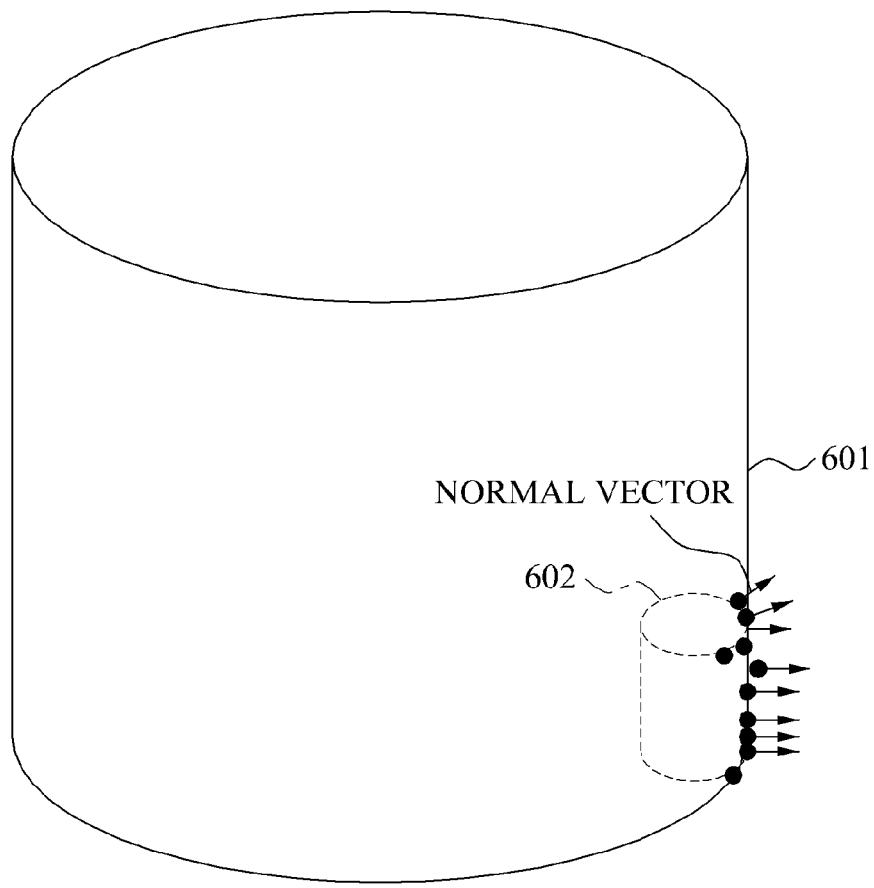
FIG. 6 is a diagram illustrating an example in which a primitive converges according to an embodiment of the present invention.

FIG. 6 is a diagram illustrating an example in which a primitive converges according to an embodiment of the present invention.

Referring to FIG. 6, a primitive fitting apparatus may compare a primitive 601 that is selected by a user and identified with a primitive 602 that includes points corresponding to inliers and that is extracted based on a point selected by the user. The primitive 601 may be a primitive generated based on a type of a primitive selected by a user, for example a cone, a cylinder and the like. The primitive 602 may be a primitive from which outliers are removed through the RANSAC algorithm.

There may be little difference in a distance and an angle, for each point, between the primitives 601 and 602. Accordingly, the primitive 602 may be included in the primitive 601.

In this instance, since there is little difference in the distance and the angle, the primitive fitting apparatus may fit the primitive 602, despite the primitive 602 being not desired by the user. Accordingly, the primitive fitting apparatus may fit an accurate primitive desired by the user, based on a difference in a distance, in an angle and in an area through a RANSAC algorithm, instead of fitting the primitive as shown in FIG. 6.

Figure 7:
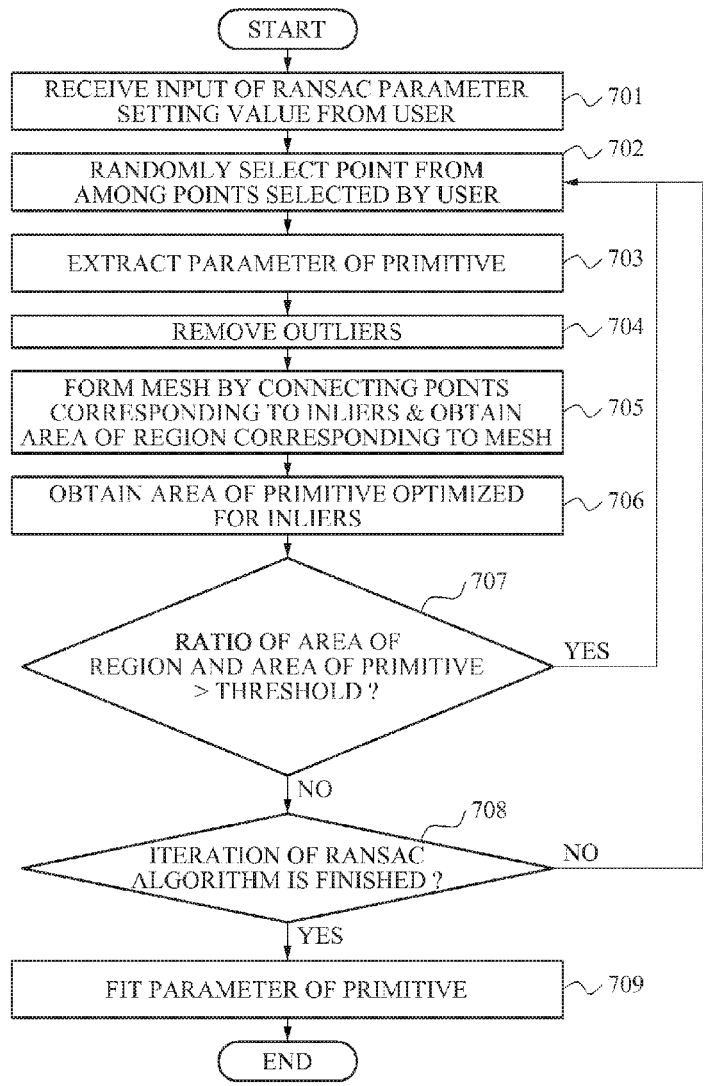
FIG. 7 is a flowchart illustrating a primitive fitting method according to an embodiment of the present invention.

FIG. 7 is a flowchart illustrating a primitive fitting method according to an embodiment of the present invention.

Referring to FIG. 7, in operation 701, a primitive fitting apparatus may receive an input of a parameter setting value of a parameter of a RANSAC algorithm from a user.

In operation 702, the primitive fitting apparatus may randomly select a predetermined point, based on a set parameter (*the parameter setting value. In this instance, the predetermined point may be one of points selected by the user.

In operation 703, the primitive fitting apparatus may extract a parameter of a primitive identified based on the selected point. The parameter of the primitive may be extracted based on a set parameter. Additionally, the parameter of the primitive may refer to a variable of the primitive. The primitive fitting apparatus may use a distance difference and an angle difference by an error function.

In operation 704, the primitive fitting apparatus may remove outliers, based on a result obtained by using the distance difference and angle difference by the error function.

In operation 705, the primitive fitting apparatus may form a mesh by connecting points corresponding to inliers obtained by removing the outliers. Additionally, the primitive fitting apparatus may obtain an area of a region corresponding to the mesh.

In operation 706, the primitive fitting apparatus may obtain an area of a primitive that is optimized for the inliers by removing the outliers.

In operation 707, the primitive fitting apparatus may compare the area of the region with the area of the primitive. Additionally, the primitive fitting apparatus may determine whether a ratio of the areas is greater than a threshold.

When the ratio of the areas is determined to be greater than the threshold, the primitive fitting apparatus may randomly select a new point from among the points selected by the user in operation 702.

In operation 708, the primitive fitting apparatus may determine whether the RANSAC algorithm is iterated. When the RANSAC algorithm is determined to be iteratively executed, the primitive fitting apparatus may randomly select a new point from among the points selected by the user in operation 702.

In operation 709, the primitive fitting apparatus may fit a parameter of the primitive.

Figure 8:
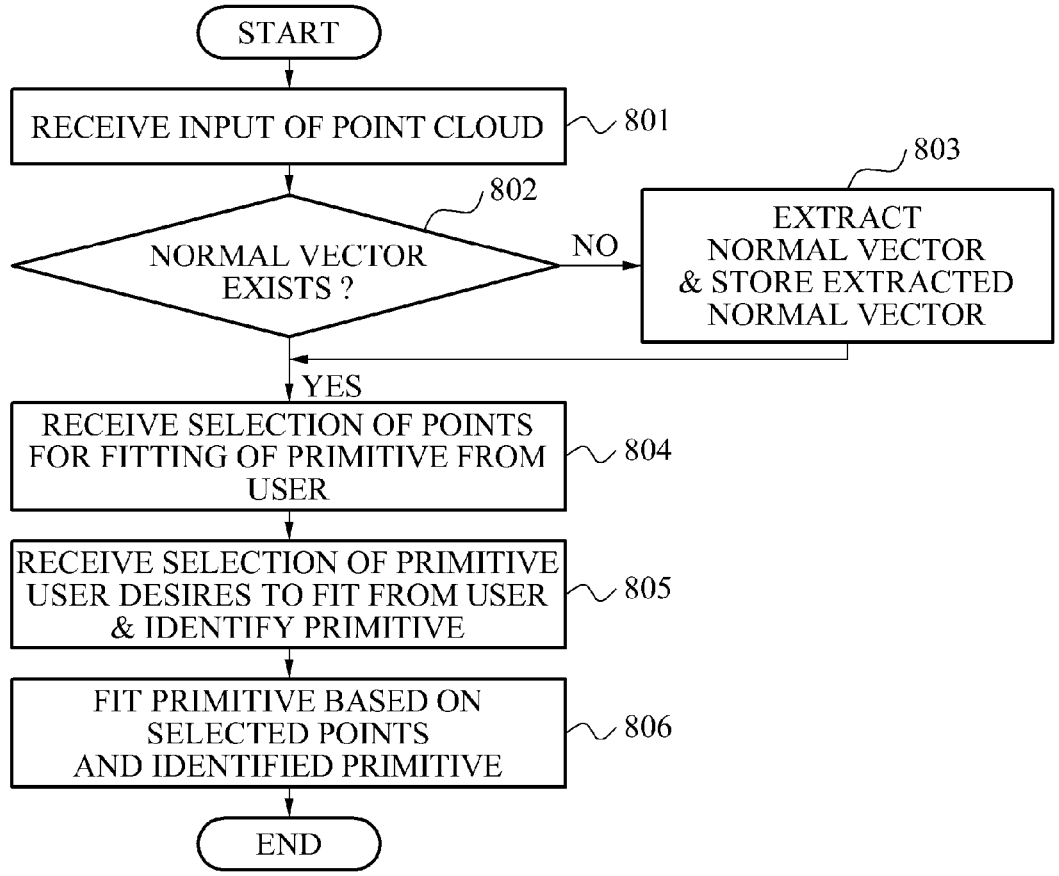
FIG. 8 is a flowchart illustrating a primitive fitting method according to another embodiment of the present invention.

FIG. 8 is a flowchart illustrating a primitive fitting method according to another embodiment of the present invention.

Referring to FIG. 8, in operation 801, a primitive fitting apparatus may receive an input of a point cloud.

In operation 802, the primitive fitting apparatus may determine whether a normal vector of each of points in the point cloud exists.

When the normal vector does not exist, the primitive fitting apparatus may extract the normal vector, and may store the extracted normal vector in operation 803.

In operation 804, the primitive fitting apparatus may receive a selection of points for fitting of a primitive from a user. In this instance, the primitive fitting apparatus may hierarchically receive the selection of the points, using a node of a hierarchical tree structure. Additionally, the primitive fitting apparatus may receive a selection of points desired by the user, using a user interface provided to the user.

In operation 805, the primitive fitting apparatus may receive a selection of a primitive the user desires to fit from the user, and may identify the primitive.

In operation 806, the primitive fitting apparatus may fit the primitive, based on the selected points and the identified primitive, so that the primitive may be matched to the selected points. The primitive fitting apparatus may remove outliers, using a distance difference and an angle difference by an error function in a RANSAC algorithm.

As described above, according to embodiments of the present invention, a primitive fitting apparatus may remove outliers, based on a difference in a distance, or in an angle between an estimated range of an identified primitive and a range of a primitive including points.

In addition, the primitive fitting apparatus may compare an area of a primitive optimized for inliers obtained by removing outliers with an area of a region corresponding to a mesh formed by connecting points corresponding to the inliers. The primitive fitting apparatus may fit a primitive, in accordance with a ratio of the areas based on a threshold associated with a difference in a preset area ratio.

A primitive fitting method, comprising: extracting a normal vector of a point, using a point cloud to be provided to a user; providing the user with a point corresponding to the extracted normal vector, and determining a primitive the user desires to fit, and points selected by the user, the points being used to fit the primitive based on the normal vector; and fitting the primitive to correspond to the points, using the points and the primitive.

The above-described embodiments of the present invention may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the embodiments, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A primitive fitting apparatus, comprising:
one or more processors configured to:
receive, from a user, a selection of points from a point cloud, the points being used to fit a primitive a user desires to fit;
receive a selection of the primitive from the user, and to identify the selected primitive; and
fit the identified primitive to correspond to the points, using the points and primitive,
wherein the processor compares an area of a primitive optimized for inliers by removing outliers with an area of a region corresponding to a mesh formed by connecting points corresponding to the inliers, and fit the primitive based on a ratio of the areas.

2. The primitive fitting apparatus of claim 1, wherein the processor provides the user with a user interface enabling the selection of the points, and receives the selection of the points.

3. The primitive fitting apparatus of claim 1, wherein the processor receives a selection of a point with a normal vector in a point cloud extracted to be provided to the user.

4. The primitive fitting apparatus of claim 1, wherein the processor hierarchically receives the selection of the points from the user through a node of a hierarchical tree structure.

5. The primitive fitting apparatus of claim 1, wherein the processor identifies a primitive of an object that is three-dimensionally represented.

6. The primitive fitting apparatus of claim 1, wherein the processor removes outliers, based on a difference in a distance between a point selected by the user and points located neighboring the selected point.

7. The primitive fitting apparatus of claim 1, wherein the processor removes outliers, based on a difference in a normal vector between a normal angle of a point selected from the identified primitive and a normal angle of a point selected from a primitive extracted based on the points.

8. The primitive fitting apparatus of claim 1, wherein the processor compares the area of the primitive with the area of the region, based on a threshold associated with a difference in a preset area ratio.

9. A primitive fitting apparatus, comprising:
one or more processors configured to:
extract a normal vector of a point, using a point cloud to be provided to a user;
provide the user with a point corresponding to the extracted normal vector, and to determine a primitive the user desires to fit, and points selected by the user, the points being used to fit the primitive based on the normal vector; and
fit the primitive to correspond to the points, using the points and the primitive,
wherein the processor compares an area of a primitive optimized for inliers by removing outliers with an area of a region corresponding to a mesh formed by connecting points corresponding to the inliers, and fit the primitive based on a ratio of the areas.

10. A primitive fitting method, comprising:
receiving, from a user, a selection of points from a point cloud, the points being used to fit a primitive a user desires to fit;
receiving a selection of the primitive from the user, and identifying the selected primitive; and
fitting the identified primitive to correspond to the points, using the points and primitive,
wherein the fitting compares an area of a primitive optimized for inliers by removing outliers with an area of a region corresponding to a mesh formed by connecting points corresponding to the inliers, and fitting the primitive based on a ratio of the areas.

11. The primitive fitting method of claim 10, wherein the receiving of the selection of the points comprises providing the user with a user interface enabling the selection of the points, and receiving the selection of the points.

12. The primitive fitting method of claim 10, wherein the receiving of the selection of the points comprises receiving a selection of a point with a normal vector in a point cloud extracted to be provided to the user.

13. The primitive fitting method of claim 10, wherein the receiving of the selection of the points comprises hierarchically receiving the selection of the points from the user through a node of a hierarchical tree structure.

14. The primitive fitting method of claim 10, wherein the receiving of the selection of the primitive comprises identifying a primitive of an object that is three-dimensionally represented.

15. The primitive fitting method of claim 10, wherein the fitting comprises removing outliers, based on a difference in a distance between a point selected by the user and points located neighboring the selected point.

16. The primitive fitting method of claim 10, wherein the fitting comprises removing outliers, based on a difference in a normal vector between a normal angle of a point selected from the identified primitive and a normal angle of a point selected from a primitive extracted based on the points.

17. The primitive fitting method of claim 10, wherein the fitting comprises comparing the area of the primitive with the area of the region, based on a threshold associated with a difference in a preset area ratio.

* * * * *